(12) United States Patent
Fehners

(10) Patent No.: US 8,195,751 B2
(45) Date of Patent: Jun. 5, 2012

(54) METHOD AND APPARATUS FOR LAST MESSAGE NOTIFICATION

(75) Inventor: Alex G. Fehners, Haywards Heath (GB)

(73) Assignee: International Business Machines Corporation, Armonk, NY (US)

( * ) Notice: Subject to any disclaimer, the term of this patent is extended or adjusted under 35 U.S.C. 154(b) by 305 days.

(21) Appl. No.: 12/258,686

(22) Filed: Oct. 27, 2008

(65) Prior Publication Data

US 2009/0113047 A1    Apr. 30, 2009

(30) Foreign Application Priority Data

Oct. 29, 2007    (EP) .................................... 07119494

(51) Int. Cl.
*G06F 15/16* (2006.01)

(52) U.S. Cl. ....................................... 709/206; 709/203

(58) Field of Classification Search .................. 709/206, 709/207, 223, 224, 203; 379/88.22, 67.1
See application file for complete search history.

(56) References Cited

U.S. PATENT DOCUMENTS

| | | | |
|---|---|---|---|
| 5,966,663 A | 10/1999 | Gleason | |
| 6,208,870 B1* | 3/2001 | Lorello et al. | 455/466 |
| 6,438,594 B1* | 8/2002 | Bowman-Amuah | 709/225 |
| 2002/0194181 A1* | 12/2002 | Wachtel | 707/10 |
| 2003/0009571 A1* | 1/2003 | Bavadekar | 709/230 |
| 2006/0047666 A1* | 3/2006 | Bedi et al. | 707/10 |
| 2006/0146991 A1* | 7/2006 | Thompson et al. | 379/67.1 |
| 2009/0298465 A1* | 12/2009 | Choi et al. | 455/406 |

FOREIGN PATENT DOCUMENTS

| | | |
|---|---|---|
| EP | 1670196 A | 6/2006 |
| EP | 1726124 B1 | 11/2006 |

* cited by examiner

*Primary Examiner* — Frantz Jean
(74) *Attorney, Agent, or Firm* — Steven M. Greenberg, Esq.; Carey, Rodriguez, Greeberg & O'Keefe

(57) ABSTRACT

An agent for generating a last message notification in an asynchronous message delivery environment, wherein messages received by a messaging server are routable to a messaging client through an API binding protocol, the agent comprising: a monitoring component for monitoring a message store to determine if there is a message stored for delivery to a message listener; and a message notification component for generating a message indicating that there are no further messages in the message store for routing to the messaging listener, in response to a negative determination by the monitoring component.

12 Claims, 5 Drawing Sheets

METHOD AND APPARATUS FOR LAST MESSAGE NOTIFICATION

CROSS-REFERENCE TO RELATED APPLICATIONS

This application claims priority under 35 U.S.C. §119(a) to European Patent Application Serial Number 07119494.8, filed 29 Oct. 2007, entitled "METHOD AND APPARATUS FOR LAST MESSAGE NOTIFICATION," the entirety of which is incorporated herein by reference.

FIELD OF THE INVENTION

The invention relates to the field of asynchronous message delivery systems. In particular, the invention relates to a method and an apparatus for generating a last message notification.

BACKGROUND OF THE INVENTION

In a messaging system each messaging queue is typically associated with a destination. The messaging system receives messages from a number of other systems. Each message relates to a particular destination. As the messages are received by the messaging system, a message listener assigned to a queue listens for a relevant message which is destined for its queue and stores each of the messages on its queue. As a message is stored on a message queue the message listener alerts its associated messaging client, who has subscribed to receive messages from the message listener's queue that a message has arrived. Control is then passed to the messaging client so that the messaging client can continue processing the message.

A problem arises when a messaging client is written using an asynchronous message delivery model. This is because the messaging client is connected to the messaging server via an API binding, meaning messages are passed directly to the client from the server, rather than through a set of network codes and/or onto a queue local to the messaging client. Examples of types of asynchronous messaging systems are, but not limited to, point-to-point and publish subscribe messaging systems.

In an asynchronous messaging system it is not always possible to determine when there are no further messages for the messaging client on the messaging system. This is because there is no socket connection on which to timeout and no local queue to query. Thus the message listener component on the messaging client is permanently active waiting for further messages to be delivered from the messaging system.

A client messaging application may receive batches of messages which will be processed in quick succession. When there are no further messages left on the queue it may mean that there is no further work to be done on that particular queue. This situation is not adequately addressed in the known prior art systems.

Thus it would be desirable to alleviate the above problems.

SUMMARY OF THE INVENTION

Viewed from a first aspect, the present invention provides an agent for generating a last message notification in an asynchronous message delivery environment, wherein messages received by a messaging server are routable to a messaging client through an API binding protocol, the agent comprising: a monitoring component for monitoring a message store to determine if there is a message stored for delivery to a message listener; and a message notification component for generating a message indicating that there are no further messages in the message store for routing to the messaging listener, in response to a negative determination by the monitoring component.

Preferably, the present invention provides an agent wherein on receipt of the message from the message notification component, the messaging listener deregisters itself.

Preferably, the present invention provides an agent wherein an API binding comprises a messaging server and a messaging client being operable on a data processing system's storage system and communicating through a direct communication connection.

Preferably, the present invention provides an agent wherein the messaging system is a point-to-point messaging system.

Preferably, the present invention provides an agent wherein the messaging system is a publish/subscribe messaging system.

Preferably, the present invention provides an agent further comprising a monitoring queue and a trawler component for retrieving messages from a message store and placing the messages on the monitoring queue for routing to a subscribing client.

Viewed from a second aspect, the present invention provides a method for generating a last message notification in an asynchronous message delivery environment, wherein messages received by a messaging server are routable to a messaging client through an API binding protocol, the method comprising the steps of: monitoring a message store to determine if there is a message stored for delivery to a message listener; and generating a message indicating that there are no further messages in the message store for routing to the messaging listener, in response to a negative determination by the monitoring step.

Preferably, the present invention provides a method further comprising the step of deregistering the message listener on receipt of the message.

Preferably, the present invention provides a method wherein an API binding comprises a messaging server and a messaging client being operable on a data processing system's storage system and communicating through a direct communication connection.

Preferably, the present invention provides a method wherein the messaging system is a point-to-point messaging system.

Preferably, the present invention provides a method wherein the messaging system is a publish/subscribe messaging system.

Preferably, the present invention provides a method further comprising the step of trawling a monitoring queue for retrieving messages from a message store and placing the messages on the monitoring queue for routing to a subscribing client.

Viewed from a third aspect, the present invention provides a broker for a publish/subscribe system said broker comprising an agent as described above, Viewed from a fourth aspect, the present invention provides a computer program product loadable into the internal memory of a digital computer, comprising software code portions for performing, when said product is run on a computer, to carry out the invention described above.

Advantageously, the present invention allows for a message to be sent to a message listener notifying of the message listener that there are no more messages left on the message queue. Thus, the message listener can be deregistered—thereby 'freeing up' valuable computing resource. An application may also want to work in batches processing one batch at a time and then perform some offline processing when it has processed all messages for a given batch. Thus allowing the message listener to register and deregister itself from the listening process as and when is needed.

BRIEF DESCRIPTION OF THE DRAWINGS

Embodiments of the invention are described below in detail, by way of example only, with reference to the accompanying drawings in which.

DETAILED DESCRIPTION OF THE INVENTION

Figure 1:
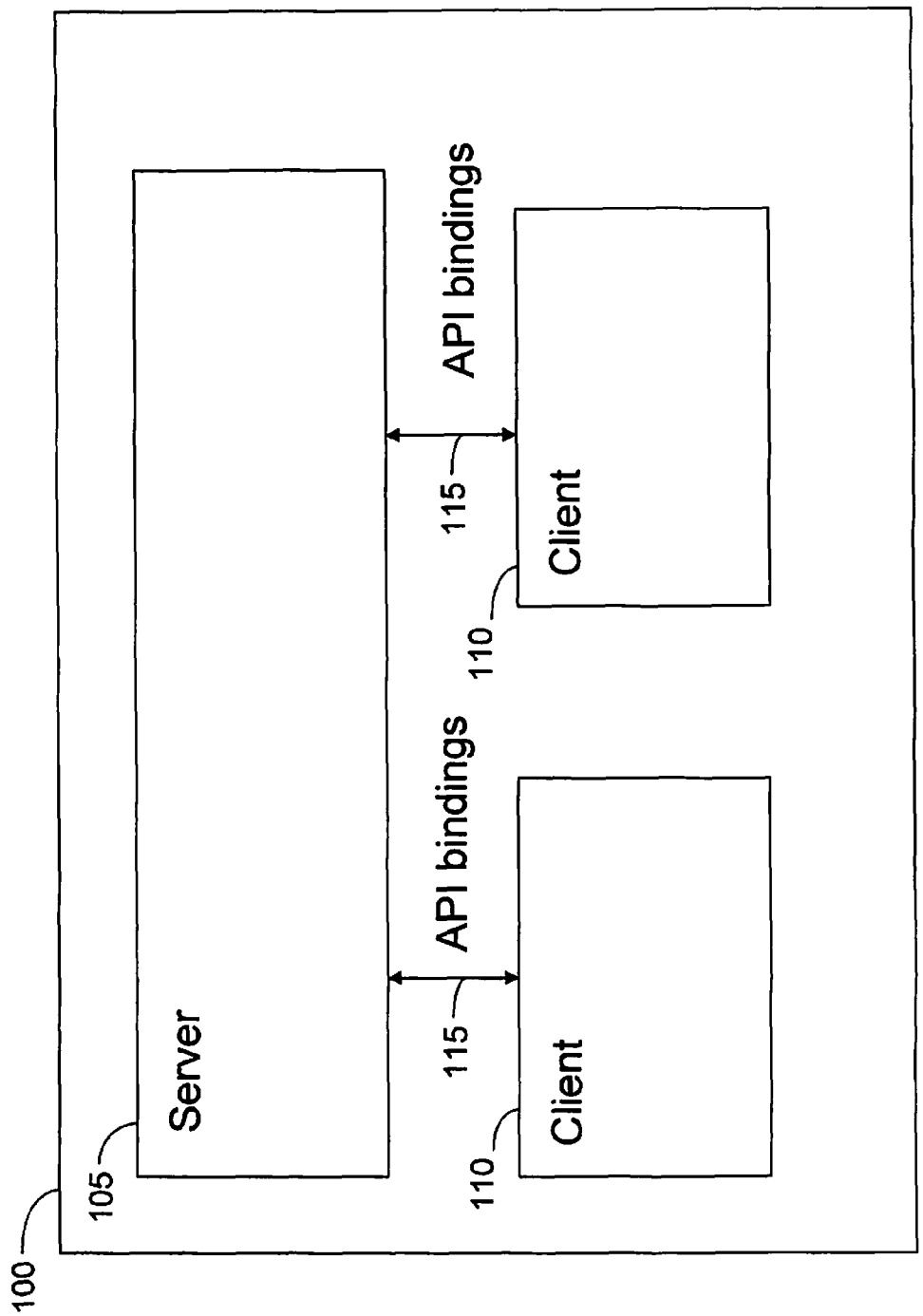
FIG. 1 is a block diagram detailing a server and client arrangement in which a preferred embodiment of the invention is operable.

FIG. 1 shows a block diagram of a messaging system in an asynchronous messaging environment comprising a messaging server 105 and a number of messaging clients 110. The messaging server 105 and the messaging clients 110 may be operable to read and write data on the data processing system's hard drive. In this type of environment messaging clients and messaging servers do not communicate with each other over a network but instead they communicate by means of a number of API bindings 115.

Two types of asynchronous messaging systems are explained below; however the present invention is operable in other types of asynchronous messaging systems and not limited to the messaging systems discussed throughout the remainder of this specification.

One type of asynchronous messaging system is a point-to-point messaging system wherein a subscribing client 110 subscribes to a messaging queue, and the messaging queue and the message listener are solely responsible for storing messages for the subscribing client 110.

Another type of messaging system is a publish/subscribe messaging system wherein messages are published to 'topic' queues on a messaging server and subscribing clients subscribe to topics of interest.

When the messaging server 105 detects that a message is stored on a topic queue which a subscribing client 110 has subscribed to, the messaging server 105 forwards the message to the subscribing client 110. In many types of messaging systems a broker is deployed to receive subscriptions from subscribers and to forward messages to subscribers.

Figure 2:
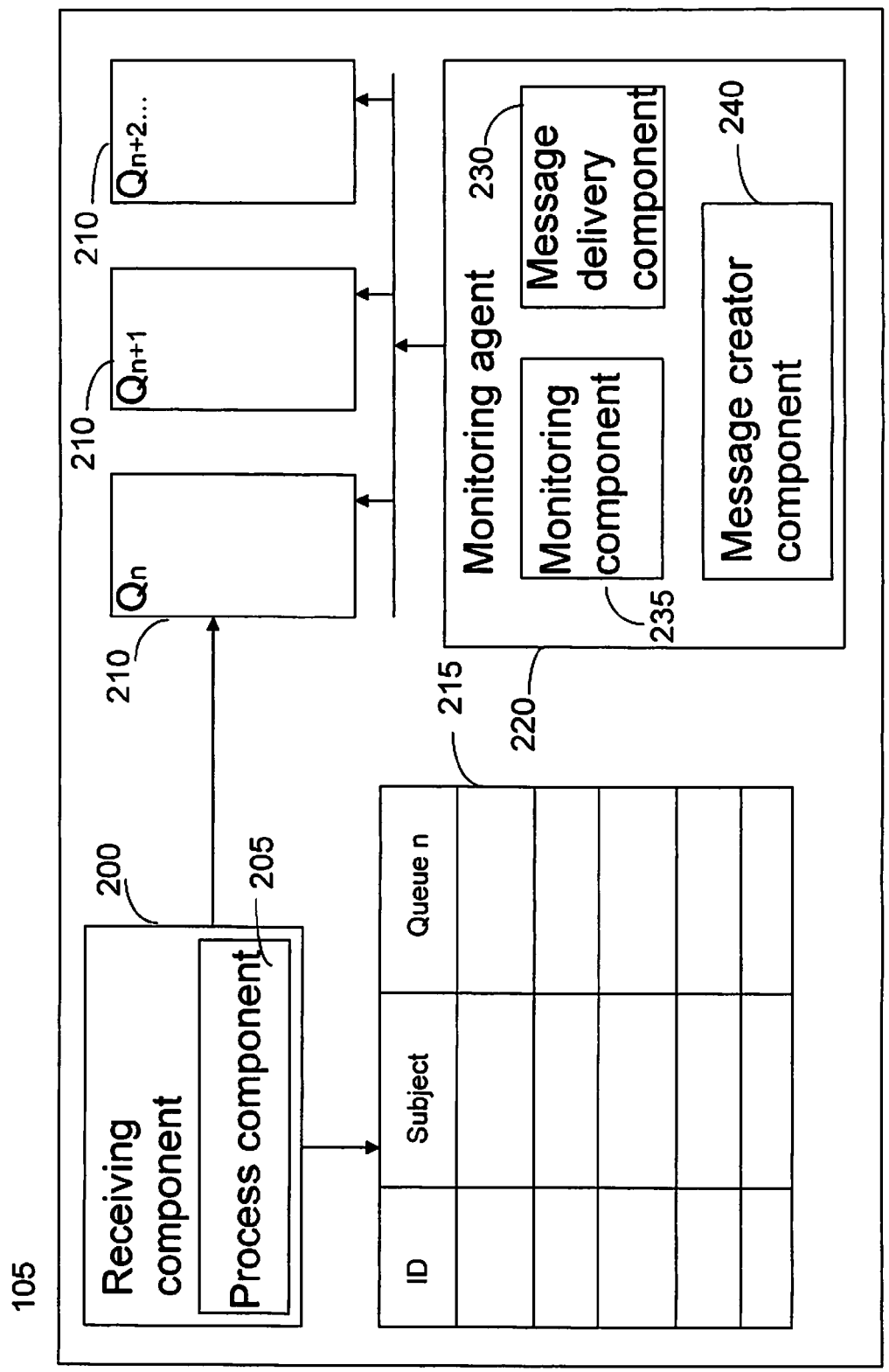
FIG. 2 is a block diagram detailing the components of a monitoring agent operable in a point-to-point messaging delivery system in accordance with a preferred embodiment of the present invention.

FIG. 2 shows the components of a monitoring agent 220 operable on a messaging server 105 in a point-to-point messaging system in accordance with a preferred embodiment of the present invention.

The messaging server 105 comprises a receiving component 200 for receiving messages from other data processing entities and a process component 205 for storing data associated with each received message, a table 215 for logging the data associated with each of the received messages, n+1 messaging queues 210 for storing each of the received messages, a monitoring agent 230 comprising a monitoring component 235 for monitoring the stack of messages on each of the messaging queues 210, a message delivery component 230 for transmitting each of the stored messages to subscribing clients and a message creator component 240 for notifying a subscribing client 110 that there are no more messages stored on their message queue 210. For clarity, a queue is defined as a temporary storage means in which messages are stored for delivery to messaging clients.

Each of these components will be explained in turn. The receiving component 200 receives messages from a number of data processing entities, for example a bank's automated clearing processing system. Each message comprises a unique identifier and a subject header, for example subject: transaction for account number 123 and a message body detailing the transaction type. The receiving component 200 forwards the message to a processing component 205 for further processing. The process component 205 logs the message header i.e. the identifier and the subject in a table stored in a data store or other in-memory representation. The process component 205 also performs a lookup in another table (not shown) to determine which queue the message should be stored on. For example, queue n 210 is associated with client A, queue n+1 210 is associated with customer A+1 and so on and routes the received message to the relevant message queue 210.

The message queue 210 is populated on a first in first out basis. As a message is stored on a queue associated with a client, a message delivery component 230 forwards the message to the client for processing.

A monitoring component 235 registers itself with each of the messaging queues 210. In a preferred embodiment there is a monitoring component 235 assigned to each of the messaging queues 210.

Each monitoring component 235 continually monitors its assigned message queue looking for messages to be passed to the message delivery component 235 for delivering to a message listener located on the subscribing messaging client 105.

Figure 3:
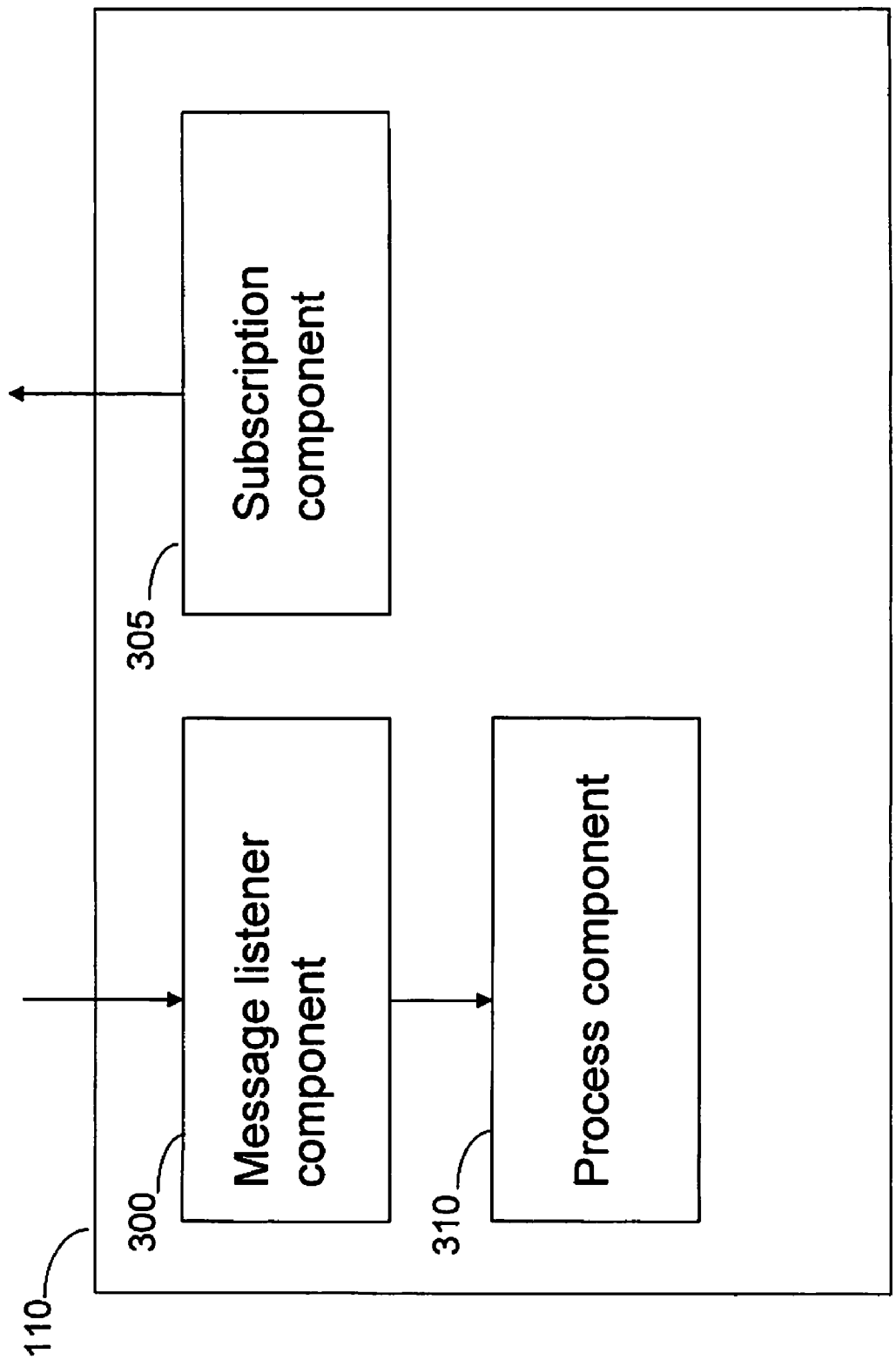
FIG. 3 is a block diagram detailing the components of a monitoring agent operable in an publish/subscribe messaging system in accordance with an alternative embodiment of the present invention.
Figure 4:
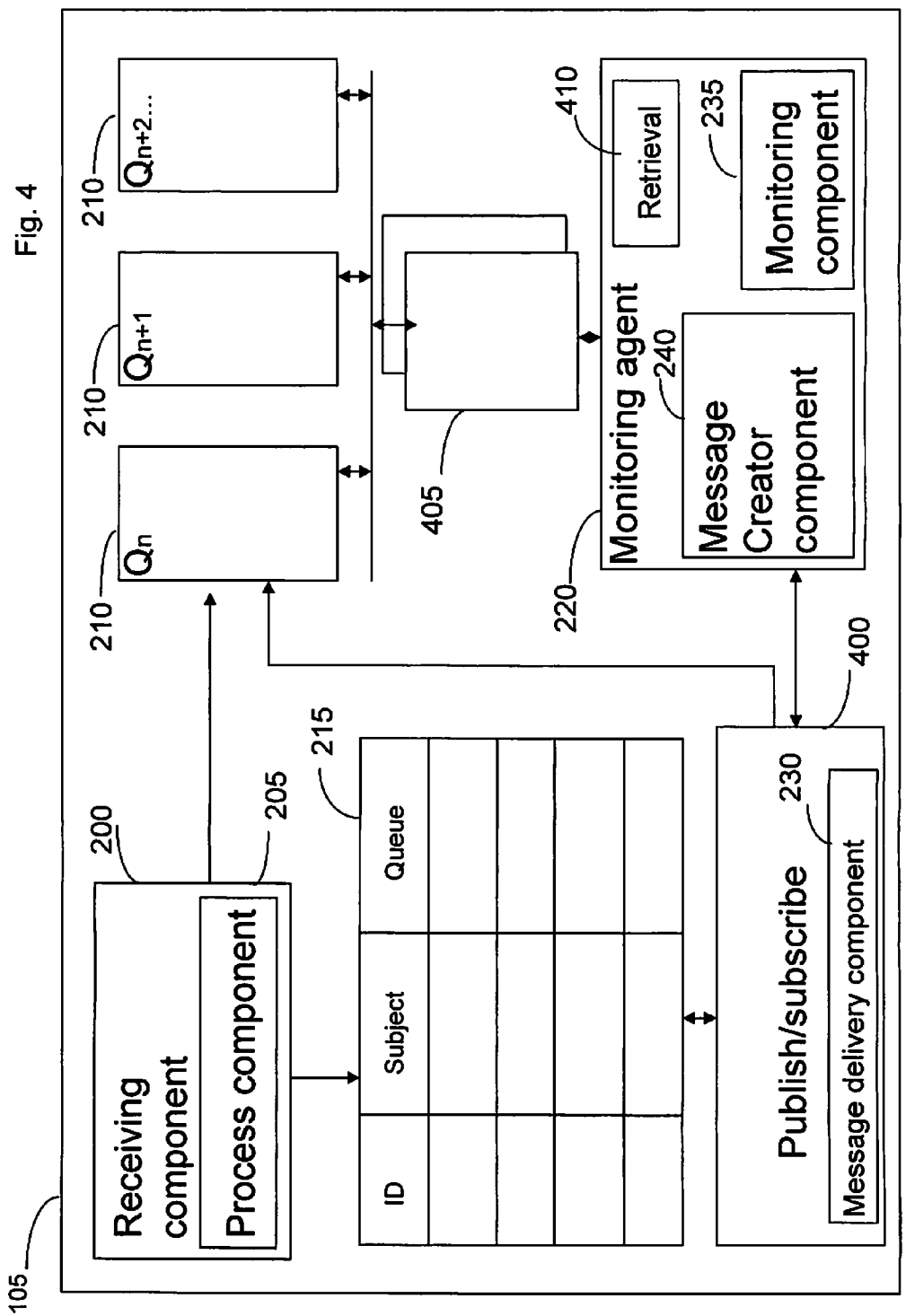
FIG. 4 is a block diagram detailing the components of a messaging client in accordance with a preferred embodiment of the present invention.

With reference to FIG. 3, the message listener component 300 receives the message from the message delivery component 230 and transmits the message to a process component 205 to perform an action as indicated by the body of the message, for example, debit account X with fifty pounds. When the message listener 300 signals that it is ready to process the next message, the message monitoring component 235 retrieves the next message on the queue and routes the message to the message delivery component for routing to the message listener for processing. The process continues until there are no further messages on the queue.

When the monitoring component 235 detects that there are no more messages in its assigned messaging queue 210, the monitoring component 235 triggers the message creator component 240 to create a message indicating that there are no further messages in the queue. The message is routed to the message listener component 300 and the message listener can, for example, de-register itself until it is required to receive further messages from the message delivery component 240.

In another embodiment the monitoring agent 220 comprises additional logic which identifies message delivery patterns from external data processing systems. For example, a particular bank may always perform its BACS processing at 3:00 pm on Monday to Friday and therefore, the monitoring component 235 will know that once no further messages have been detected in a messaging queue 210 there will be no further messages for the messaging client until, for example, 3:00 pm the next day. Thus the message listener component 300 can de-register itself.

In alternative embodiment, the monitoring agent 220 is operable for use in a publish/subscribe messaging system in an asynchronous message delivery environment.

In this embodiment the messaging server 105 comprises a publish/subscribe component 400 for receiving subscriptions from subscribers and publishing messages that subscribers have subscribed too. In this example, each queue 210 is associated with a topic. Subscribers subscribe to a topic of interest.

The receiving component 200 receives messages from external data processing entities. A process component 205 interacts with the receiving component 200 and logs the unique identifier and the subject associated with the received message in a table. The message is then assigned a queue number and the message is placed onto its assigned queue. Once a message has been placed on a messaging queue the publish component 400 identifies a subscribing client 105 which has expressed an interest in a particular topic and the publish component 400 via the message delivery component 230 delivers the message to the message listener component 300 on the client device 105.

In this example the monitoring component 235 is assigned its own monitoring queue 405. This is an additional queue to the topic queue. As each message is placed on to the relevant topic queue, a retrieval component 410 trawls through the queue and retrieves each of the messages that its assigned client has subscribed to and places these messages in its own monitoring queue 405.

As each message is placed on a monitoring queue 405, the message delivery component 230 forwards the message to the subscribing client 105. At the same time the monitoring component 235 monitors the monitoring queue 405 for further messages. When the monitoring component 235 detects that there are no further messages for a subscribing client 105 the monitoring component 235 instructs the message creator component 240 to create a 'no more messages' message for routing to the message listener component 300 on the subscriber client 105.

Figure 5:
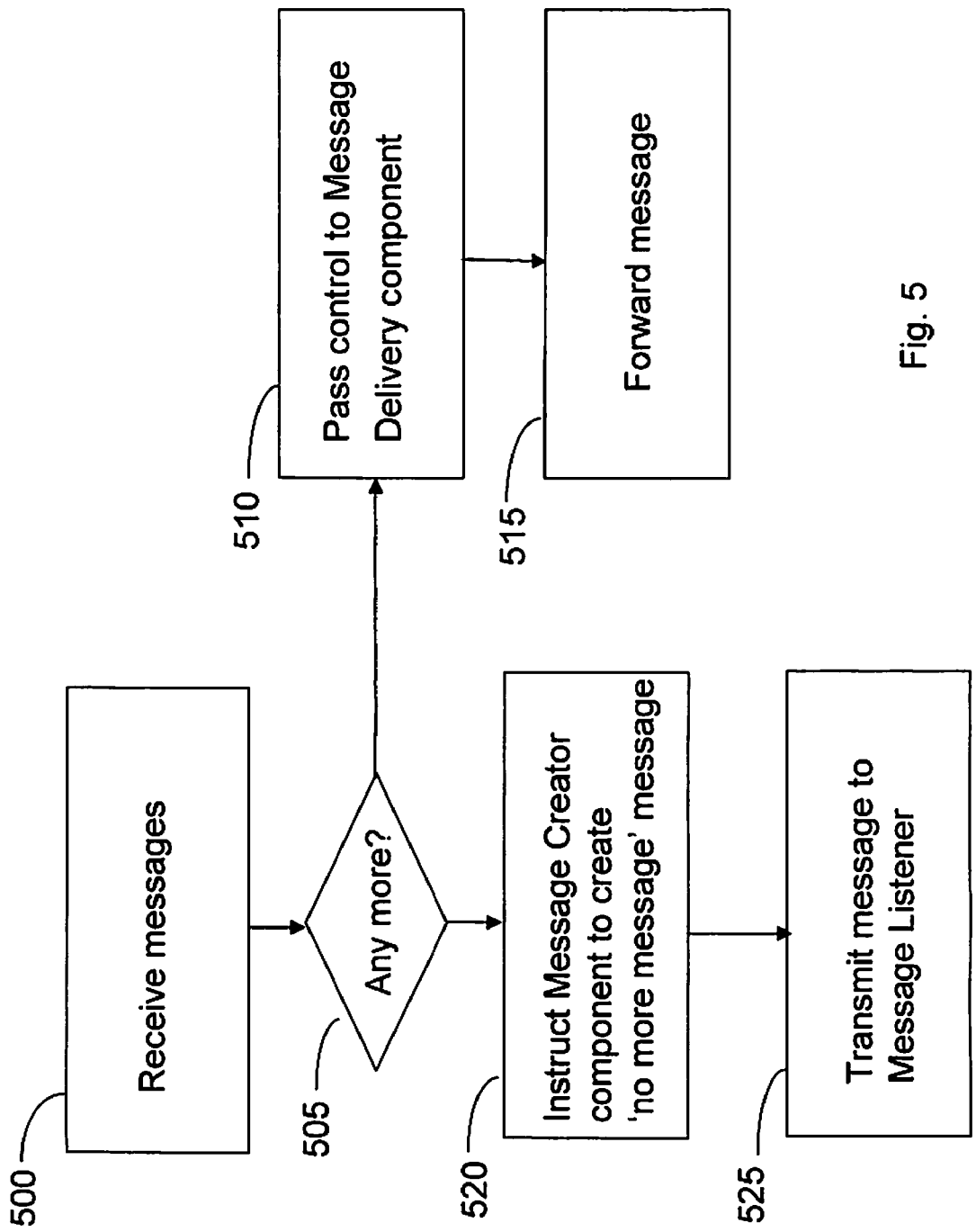
FIG. 5 is a flow chart showing the process steps of the monitoring agent in accordance with a preferred embodiment of the present invention.

FIG. 5 shows the process steps of the monitoring agent 220 on a messaging server 110. At step 500, the messaging component 230 monitors a messaging queue 210, 405 for messages. At step 505, a determination is made as to whether the queue 210, 405 comprises any further messages, if the determination is positive control passes to step 510 and the message delivery component 230 forwards the message onto a message listener 300 on the subscribing client 105. Moving back to step 505, if the determination is negative and there are no further messages on the messaging queue, the monitoring component 235 instructs the message creator component 240 to create a 'no more messages' message for forwarding to the message listener component 300 at step 520 such that the message listener component can take appropriate action at step 525.

The invention claimed is:

1. An agent for generating a last message notification in an asynchronous message delivery environment, wherein messages received by a messaging server are routable to a messaging client through an API binding protocol, the agent comprising:
   a monitoring component for monitoring a message store to determine if there is a message stored for delivery to a message listener; and
   a message notification component for generating a message indicating that there are no further messages in the message store for routing to the messaging listener, in response to a negative determination by the monitoring component,
   wherein on receipt of the message from the message notification component, the messaging listener deregisters itself.

2. An agent as claimed in claim 1 wherein an API binding comprises a messaging server and a messaging client being operable on a data processing system's storage system and communicating through a direct communication connection.

3. An agent as claimed in claim 1 wherein the messaging system is a point-to-point messaging system.

4. An agent as claimed in claim 1 wherein the messaging system is a publish/subscribe messaging system.

5. An agent as claimed in claim 4 further comprises a monitoring queue and a trawler component for retrieving messages from a message store and placing the messages on the monitoring queue for routing to a subscribing client.

6. A method for generating a last message notification in an asynchronous message delivery environment, wherein messages received by a messaging server are routable to a messaging client through an API binding protocol, the method comprising the steps of:
   monitoring a message store to determine if there is a message stored for delivery to a message listener; and
   generating a last message notification indicating that there are no further messages in the message store for routing to the messaging listener, in response to a negative determination by the monitoring step,
   wherein on receipt of the last message notification, the messaging listener deregisters itself.

7. A method as claimed in claim 6 wherein an API binding comprises a messaging server and a messaging client being operable on a data processing system's storage system and communicating through a direct communication connection.

8. A method as claimed in claim 6 wherein the messaging system is a point-to-point messaging system.

9. A method as claimed in claim 6 wherein the messaging system is a publish/subscribe messaging system.

10. A method as claimed in claim 9 further comprises the step of trawling a monitoring queue for retrieving messages from a message store and placing the messages on the monitoring queue for routing to a subscribing client.

11. A broker for a publish/subscribe system said broker comprising an agent comprising:
   a monitoring component for monitoring a message store to determine if there is a message stored for delivery to a message listener; and
   a message notification component for generating a message indicating that there are no further messages in the message store for routing to the messaging listener, in response to a negative determination by the monitoring component,
   wherein on receipt of the message from the message notification component, the messaging listener deregisters itself.

12. A computer program product loadable into the internal memory of a digital computer, comprising software code portions for performing, when said product is run on a computer, to carry out operations comprising:
   monitoring a message store to determine if there is a message stored for delivery to a message listener; and
   generating a last message notification indicating that there are no further messages in the message store for routing to the messaging listener, in response to a negative determination by the monitoring step,
   wherein on receipt of the last message notification, the messaging listener deregisters itself.

* * * * *